July 27, 1937.  A. C. MABEE  2,087,982
AUTOMOBILE LOCK
Filed July 29, 1936  2 Sheets-Sheet 1
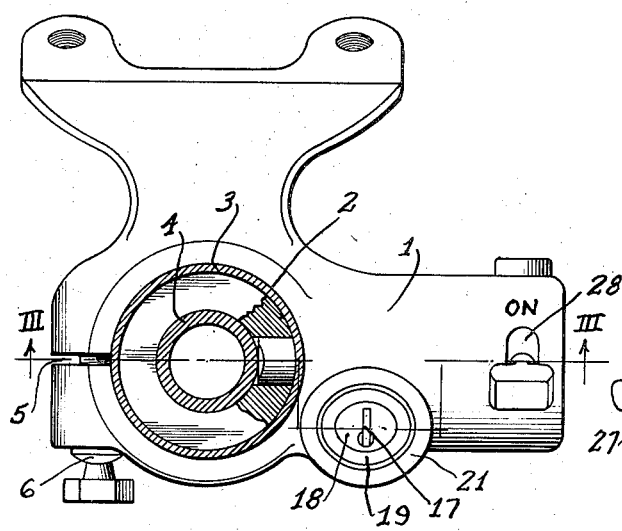
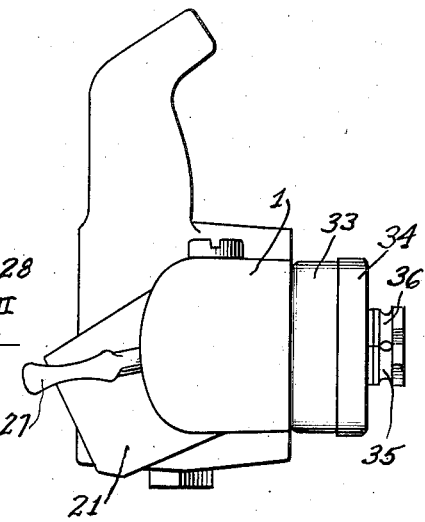
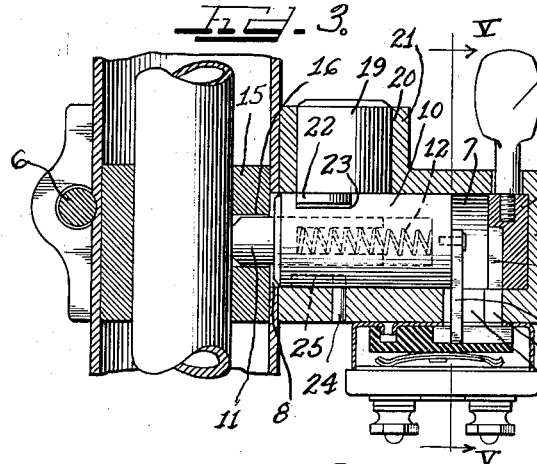
Inventor
ALEXANDER C. MABEE.

July 27, 1937.                A. C. MABEE                 2,087,982
                            AUTOMOBILE LOCK
                          Filed July 29, 1936            2 Sheets-Sheet 2
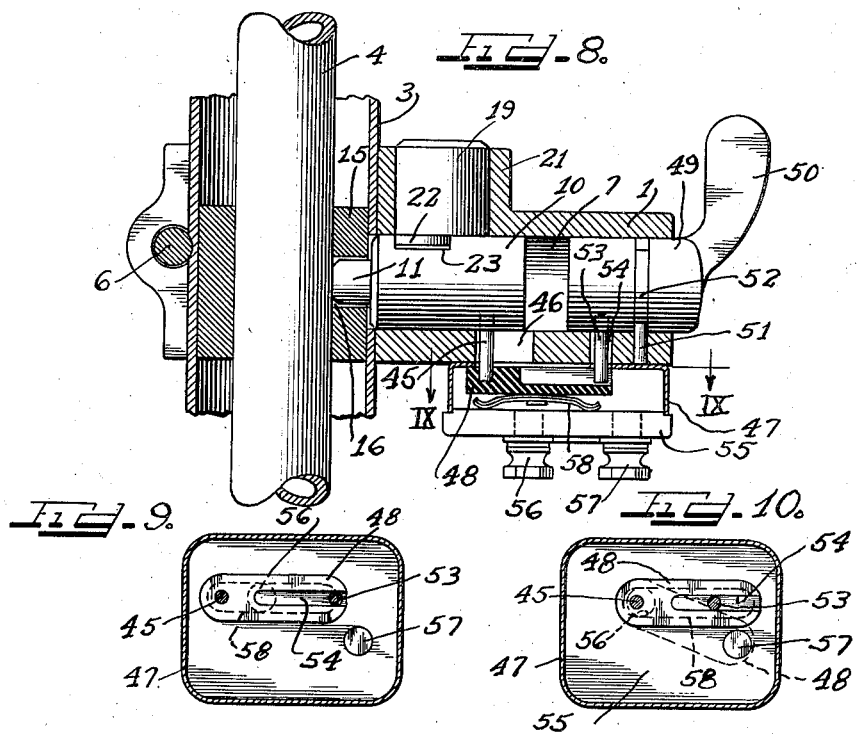
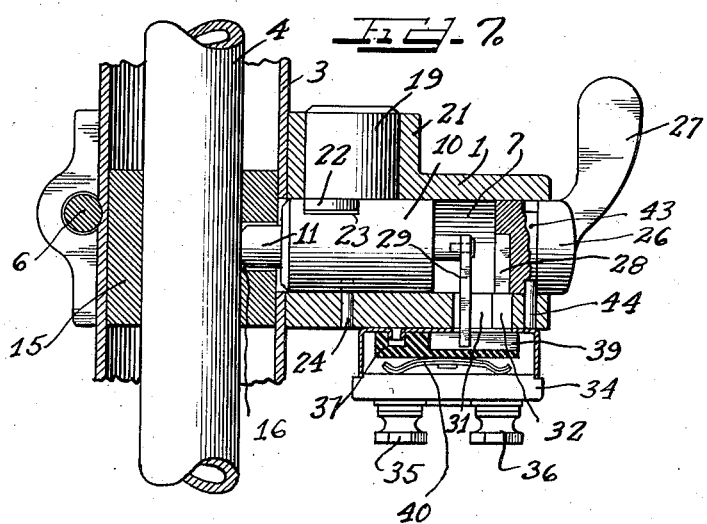
Inventor
ALEXANDER C. MABEE.
by Charles O'Neill Atty.

Patented July 27, 1937

2,087,982

UNITED STATES PATENT OFFICE 2,087,982

AUTOMOBILE LOCK

Alexander C. Mabee, Villa Park, Ill., assignor to Oakes Products Corporation, North Chicago, Ill., a corporation of Michigan Application July 29, 1936, Serial No. 93,156

7 Claims. (Cl. 70—252)

My invention relates to a lock structure adapted particularly for use on automotive vehicles for locking operation controls such as, for example, the steering and the ignition. The invention concerns particularly a two-stage or sequential operation type of lock with the first stage operation effecting unlocking or release of the steering and establishing operating conditions for an ignition controlling switch, and the second stage operation effecting opening or closing of the ignition controlling switch.

An important object of the invention is to provide an arrangement comprising a lock bolt element shiftable axially to locking or unlocking position by a key-controlled means, and a rotatable switch controlling element, usually comprising a lever, with interconnecting means adapted, when the locking bolt is in its unlocking position, to establish an operative connection between the switch control element and the switch so that upon rotation of the element the switch may be operated for opening and closing the ignition circuit, and said interconnecting means being adapted, when the lock bolt element is in locking position, to disconnect the switch controlling element from operative connection with the switch so that the switch controlling element is then entirely free for rotational movement but without any operation of the switch to effect the circuit. In other words, when the locking bolt is in unlocking position rotational movement of the switch controlling element will be effective to operate the switch for circuit control, but when the lock bolt is in locking position the switch controlling element is entirely free, and tho rotatable, its operation will have no effect either to open or close the ignition circuit.

My invention is shown incorporated in the structure disclosed on the drawings, in which drawings:

Figure 1 is a plan view of the lock structure applied to a steering column which is shown in transverse section;

Figure 2 is an end view of the lock structure;

Figure 3 is a section on plane III—III of Figure 1;

Figure 4 is a section similar to Figure 3 showing the locking bolt in unlocking position;

Figure 5 is a section on plane V—V of Figure 3;

Figure 6 is an inside plan view of the switch terminal supporting cover;

Figure 7 is a section similar to Figure 3 showing a modified arrangement;

Figure 8 is a section similar to Figure 3 showing another modified arrangement;

Fig. 9 is a section on plane IX—IX of Figure 8, showing the movable switch element in one position, and Figure 10 is a view similar to Figure 9 showing the movable switch element in another position.

Referring to Figures 1 to 6, the lock structure shown comprises a generally cylindrical body 1 having the cylindrical opening 2 therethrough at its left end for receiving the tube 3 which surrounds the steering shaft 4 of an automobile, the body being slit as indicated at 5 so that the material around the opening 2 may securely clamp the tube 3 by tightening of a screw 6.

The body 1 has the cylindrical bore 7 registering at its open end with a passage 8 in the tube 3, the outer end of the bore being closed by the wall 9. Slidable in the bore 7 is a lock bolt structure comprising the barrel 10 and the locking plunger 11, a spring 12 within the barrel urging the plunger outwardly, such outward movement being limited as by means of a pin 13 in the barrel 10 engaging in a channel 14 in the plunger, Figure 4.

The steering shaft 4 has a bushing 15 secured thereto provided with the hole 16, and when this hole is in axial alignment with the bore 7, and the lock bolt structure shifts outwardly, the plunger 11 will enter the hole to lock the steering shaft 4 against rotation by the steering wheel. The shifting of the lock bolt structure is controlled by the turning of a key in the key hole 17 of a tumbler lock cylinder 18 within the lock barrel 19 secured in the bore 20 in the boss 21 extending from the body 1, the lock cylinder at its inner end carrying a cam 22 engaging in the notch 23 in the lock bolt barrel 10 so that when the key is turned the lock bolt structure may be shifted to locking position, Figure 3, or to unlocking position, Figure 4. The hub 26 has a radially extending channel 28 for receiving a pin 29 extending radially from and pivoted against the outer end of the lock bolt barrel 10 by a pin 30. This pin or finger 29 extends downwardly through a longitudinally extending slot 31 in the body 1, the width of the slot being substantially the width of the pin so that the pin may readily shift in the slot when the lock bolt structure 10 is reciprocated. The slot 31 terminates at its outer end in a transversely extending slot 32 which is in alignment with the channel 28 in the switch element controlling hub 26. When the lock bolt structure 10 is shifted to locking position as shown in Figure 3, the finger 29 is displaced from the channel 28 so that the switch operating element is entirely free for rotational movement. However when the lock bolt structure is shifted to its unlocking position as shown in Figure 4, the finger 29 enters the channel 28 and then when the hub 26 is rotated the finger will swing therewith for operating the switch mechanism to open or close the electrical circuit, which may be the ignition circuit for the vehicle engine.

The switch mechanism is contained within a sheet metal casing 33 which engages with its base against the rear side of the body 1 and has a cover 34 of insulating material supporting circuit terminals 35 and 36. An oblong switch block 37 of insulating material engages against the bottom of the housing 33 and is pivoted at its inner end as by a projection 38 deflected from the housing bottom. At the outer end of and at its inner side the switch block has the longitudinally extending channel 39 into which the finger 29 projects. A switch blade 40 is secured intermediate its ends to the outer side of the switch block, the end of the switch blade which is in alignment with the pivot extension 38 being always in contact with the circuit terminal 35, and when the switch block is rotated, the other end of the switch blade will engage with the circuit terminal 36, the circuit to be controlled being connected with the terminals 35 and 36. The spring action of the switch blade holds the switch block against the bottom of the housing 33.

Describing now the operation, when the lock bolt structure is in steering locking position as shown in Figure 3, the finger 29 is within the longitudinal slot 31 and displaced from the channel 28 in the hub 26 of the switch controlling element, the finger extending into the channel 39 of the switch block and the switch block being parallel with the axis of the lock bolt structure. The hub 26 can now be rotated freely by swing of its handle 27 but there can be no switch operation. However when the lock bolt structure is shifted to steering unlocking position as shown in Figure 4, the finger 29 enters the channel 28 and the cross slot 32, and then when the hub 26 is turned by upward swing of the handle 27 the switch block will be swung for engagement of its switch blade with the terminal 36 for closure of the ignition circuit. The circuit can now be opened or closed at will by swing of the handle 27 but the lock bolt structure cannot be shifted back to steering locking position until the lever 27 has been swung to open the switch and bring the finger out of the cross slot 32 and back into alignment with the longitudinal slot 31 so that steering lock can be effected only after the switch has been opened.

In order to yieldably hold the switch operating element in its switch on or off position a spring pressed detent 41 may be provided for engaging in the depressions 42 in the hub 26, as shown in Figure 5. When the lock bolt structure is in its steering locking position the switch controlling element may then be swung or snapped back and forth into on or off position but there will be no operation of the switch.

The structure disclosed in Figure 7 is substantially the same as the structure in Figures 1 to 6 except that the hub 26 of the switch controlling element extends a distance outside of the open end of the bore 7 so that the handle 27 is entirely outside of the body 1. To lock the hub against longitudinal displacement, it is provided with a circumferential channel 43 receiving a pin 44 extending through the wall of the body 1.

In the arrangement of Figures 8, 9 and 10, the lock bolt barrel 10 has a pin 45 extending radially therefrom through a longitudinal slot 46 in the body 1 so that the lock bolt structure may be shifted longitudinally but prevented from rotating. The pin 45 extends into the switch housing 47 and forms a pivot for the switch block 48 so that when the lock bolt structure is shifted axially the switch block will shift therewith, and the shift block may be swung on the pin 45 as the pivot.

The hub 49 of the switch actuating element extends into the outer end of the bore 7 and has the handle 50 whereby it may be readily oscillated. The hub is held against axial movement by a pin 51 engaging in a circumferentially extending channel 52. The hub has a pin 53 extending radially therefrom thru a circumferentially extending slot 54 in the body 1, the end of the pin extending into the longitudinal channel 55 in the switch block so that when the hub 49 is oscillated the switch block will be swung.

The switch housing 47 is closed by a cover 55 of insulating material supporting the circuit terminals 56 and 57. The switch block carries the switch blade 58 parallel therewith and with its inner end in alignment with the pin 45 which pivots the switch block.

When the lock bolt structure 10 is in its steering locking position as shown in Figures 8 and 9, the switch block will be held in its inner position with the pivot end of its switch blade in longitudinal alignment with but out of contact with the terminal 56. The terminal 57 is to one side of the longitudinal path of travel of the switch block and away from the switch blade so that neither terminal is engaged by the switch blade when the lock structure is in steering locking position. Now when the hub 49 is oscillated, the switch block will be correspondingly oscillated but there will be no engagement of the switch blade with the circuit terminals, and the circuit, such as the ignition circuit, can not be controlled. However when the lock bolt structure is shifted outwardly to unlocking position the switch block is shifted longitudinally therewith to bring the pivot end of the switch blade into contact with the terminal 56 and the other end of the blade at one side of the terminal 57. Now when the hub 49 is rotated the switch block will swing to carry the outer end of the switch blade into engagement with the contact 57 for closure of the ignition circuit.

When it is desired to lock the steering and the ignition circuit, the hub 49 is first rotated to swing the switch back to circuit opening position, and then the key is turned to shift the lock bolt into steering locking position and to return the switch block for disconnection of its switch blade from the terminal contacts.

I have shown practical and efficient embodiments of the various features of my invention but I do not desire to be limited to the exact construction, arrangement and operation shown and described as changes and modifications are possible which will still come within the scope of the invention.

I claim as my invention:

1. In a lock structure of the class described, a locking bolt for locking the steering of an automobile, a switch for the vehicle engine ignition circuit, an actuating member for said switch freely movable in switch operating direction but without effecting circuit controlling operation of the switch when said bolt is in locking position, and coupling means effective only when said bolt is moved to unlocking position for coupling said actuating member to said switch whereby movement of said actuating member will then effect circuit controlling operation of the switch.

2. In a steering and ignition lock, a locking bolt for the steering, an ignition switch, an actuating member for said switch uncoupled from said switch when said locking bolt is in locking position, and means carried by said bolt for coupling said actuating member to said switch when said bolt is moved to unlocking position whereby movement of said actuating member will then effect circuit control operation of the switch.

3. In lock structure of the class described, a locking bolt, a switch, an actuating member for said switch free to be moved but operatively disconnected from said switch when said lock bolt is in locking position, and means effective when said lock bolt is moved to unlocking position for establishing operative connection between said actuating member and switch.

4. In lock structure of the class described, a locking bolt, a switch, an actuating member for said switch movable in a fixed path, and coupling means controlled by the movement of said locking bolt to couple said actuating member to said switch whereby said switch may be moved with said actuating member for circuit controlling operation, said coupling means being withdrawn from said actuating member when said locking bolt is moved to locking position whereby said actuating member is then free of said switch for idle movement in its path.

5. In lock structure of the class described, a locking bolt, a switch, an actuating member for said switch movable in a fixed path, and coupling means controlled by the movement of said locking bolt to couple said actuating member to said switch whereby said switch may be moved with said actuating member for circuit controlling operation, said coupling means being withdrawn from said actuating member when said locking bolt is moved to locking position whereby said actuating member is then free of said switch for idle movement in its path, and means whereby uncoupling cannot be effected until said actuating member has been moved to open said switch.

6. In a lock structure of the class described, a locking bolt, a switch, an actuating member for said switch, means establishing an operating connection between said actuating member and switch when said lock bolt is moved to unlocking position, and means for breaking said connection when said lock bolt is shifted to locking position whereafter said actuating member may be idly moved without affecting the switch.

7. In a lock structure of the class described, a locking bolt, a switch, an actuating member for said switch movable in a fixed path, said actuating member being freely movable in said path but without effecting circuit controlling operation of said switch when said lock bolt structure is in locking position, and means controlled by the movement of said bolt to unlocking position to connect said switch with said actuating member for circuit operation control by the switch when said actuating member is actuated.

ALEXANDER C. MABEE.